(12) United States Patent
Brennan, III et al.

(10) Patent No.: US 7,822,347 B1
(45) Date of Patent: Oct. 26, 2010

(54) ACTIVE TUNING OF TEMPORAL DISPERSION IN AN ULTRASHORT PULSE LASER SYSTEM

(75) Inventors: James Francis Brennan, III, Winter Park, FL (US); Laurent Vaissié, Oviedo, FL (US); Michael Marshall Mielke, Orlando, FL (US)

(73) Assignee: Raydiance, Inc., Petaluma, CA (US)

( * ) Notice: Subject to any disclaimer, the term of this patent is extended or adjusted under 35 U.S.C. 154(b) by 1014 days.

(21) Appl. No.: 11/391,936

(22) Filed: Mar. 28, 2006

(51) Int. Cl.
*H04B 10/04* (2006.01)
(52) U.S. Cl. .................. 398/193; 398/189; 398/199
(58) Field of Classification Search ............ 398/182, 398/189–191, 193, 199–201
See application file for complete search history.

(56) References Cited

U.S. PATENT DOCUMENTS

| | | | | |
|---|---|---|---|---|
| 4,928,316 | A * | 5/1990 | Heritage et al. | 398/199 |
| 5,694,501 | A | 12/1997 | Alavie | |
| 6,760,356 | B2 | 7/2004 | Erbert et al. | |
| 6,834,134 | B2 | 12/2004 | Brennan, III | |
| 7,095,772 | B1 * | 8/2006 | Delfyett et al. | 372/50.22 |
| 7,349,452 | B2 | 3/2008 | Brennan, III | |
| 7,444,049 | B1 | 10/2008 | Kim | |
| 2001/0021294 | A1 | 9/2001 | Cai | |
| 2003/0086647 | A1 | 5/2003 | Willner | |
| 2003/0223689 | A1 | 12/2003 | Koch | |
| 2004/0037505 | A1 | 2/2004 | Morin | |
| 2005/0163426 | A1 * | 7/2005 | Fermann et al. | 385/37 |
| 2005/0175280 | A1 | 8/2005 | Nicholson | |
| 2005/0226278 | A1 * | 10/2005 | Gu et al. | 372/6 |
| 2006/0056480 | A1 | 3/2006 | Mielke | |
| 2006/0093012 | A1 | 5/2006 | Singh | |
| 2006/0120418 | A1 * | 6/2006 | Harter et al. | 372/30 |
| 2006/0268949 | A1 * | 11/2006 | Gohle et al. | 372/21 |
| 2007/0047965 | A1 * | 3/2007 | Liu et al. | 398/147 |
| 2007/0196048 | A1 * | 8/2007 | Galvanauskas et al. | 385/37 |

OTHER PUBLICATIONS

Limpert et al., "All Fiber Chirped-Pulse Amplification System Based on Compression in Air-Guiding Photonic Bandgap Fiber", Optics Express, Dec. 1, 2003, vol. 11, No. 24, pp. 3332-3337.
Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.
Eggleton, et al., "Electrically Tunable Power Efficient Dispersion Compensating Fiber Bragg Grating," IEEE Photonics Technology Letters, vol. 11, No. 7, pp. 854-856, Jul. 1999.

(Continued)

*Primary Examiner*—Dzung D Tran
(74) *Attorney, Agent, or Firm*—Carr & Ferrell LLP (57) ABSTRACT

A chirped pulse amplification (CPA) system and method is described wherein the dispersion of the system is tuned by actively tuning one or more system components, for example, using a temperature or strain gradient, or using actinic radiation. In other embodiments, an additional element, such as a modulator, is added to the CPA system to actively to tune the pulse. A pulse monitor is added to the system to measure an output pulse and provide feedback to one or more active tuning elements.

14 Claims, 5 Drawing Sheets

OTHER PUBLICATIONS

Hellström, E. et al., "Third-Order Dispersion Compensation Using a Phase Modulator", Journal of Lightwave Technology, vol. 21, No. 5, pp. 1188-1197, May 2003.

Jiang, et al., "Fully dispersion compensated ~500 fs pulse transmission over 50 km single mode fiber," Purdue University ECE Annual Research Summary, Jul. 1, 2004-Jun. 30, 2005.

Jiang, et al., "Fully dispersion-compensated ~500 fs pulse transmission over 50 km single-mode fiber," Optics Letters, vol. 30, No. 12, pp. 1449-1451, Jun. 15, 2005.

Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.

Kwon, et al., "Tunable dispersion slope compensator using a chirped fiber Bragg grating tuned by a fan-shaped thin metallic heat channel," IEEE Photonics Technology Letters, vol. 18, No. 1, pp. 118-120, Jan. 1, 2006.

Nibbering, E.T.J., et al., "Spectral determination of the amplitude and the phase of intense ultrashort optical pulses," Journ. Optical Society of America B, vol. 13, No. 2, pp. 317-329, Feb. 1996.

Pelusi, M. D., et al., "Electrooptic Phase Modulation of Stretched 250-fs Pulses for Suppression of Third-Order Fiber Disperson in Transmission," IEEE Photonics Technology Letters, vol. 11, No. 11, pp. 1461-1463, Nov. 1999.

Pelusi, M. D., et al., "Phase modulation of stretched optical pulses for suppression of third-order dispersion effects in fibre transmission," Electronics Letters, vol. 34, No. 17, pp. 1675-1677, Aug. 20, 1998.

Zhou, S., et al., "Compensation of nonlinear phase shifts with third-order dispersion in short-pulse fiber amplifiers," Optics Express, vol. 13, No. 13, pp. 4869-4877, Jun. 27, 2005.

* cited by examiner

ACTIVE TUNING OF TEMPORAL DISPERSION IN AN ULTRASHORT PULSE LASER SYSTEM

BACKGROUND

1. Field of the Invention

The invention relates to laser systems and more specifically to actively tuning components in a laser system.

2. Related Art

Nearly all high peak power USP laser systems use the technique of chirped pulse amplification (CPA) to produce short-duration high-intensity pulses. Chirped pulse amplification increases the energy of a short pulse while avoiding optical amplifier damage. In this technique, the duration of the pulse is increased by dispersing it temporally as a function of wavelength (a process called "chirping"), amplifying the chirped pulse, and then recompressing the chirped pulse to significantly shorten its duration. By lengthening the pulse in time, energy can be efficiently extracted from an optical amplifier gain medium while the peak power levels of the pulse are below the damage threshold of the optical amplifier.

The dispersion in CPA laser systems can vary due to many factors. For instance, most CPA systems rely on Treacy compressors to reform pulses after they have been amplified. The optical path in a Treacy compressor is relatively long and is mostly through air. The refractive index of air may seem negligible, but it can vary the operating wavelength of the system from that of a vacuum by ~0.5 nm at ~1550 nm. The refractive index of air varies with temperature, pressure, and relative humidity, so changes in environment can affect system performance. The dispersion of various other components in a CPA system may also vary with environmental conditions, such as Bragg fiber and fiber Bragg gratings (FBGs). The refractive index of system components can vary with pulse intensity via optical nonlinear processes, which can also induce optical phase variations similar to dispersion and ultimately effect pulse duration.

The manufacturing tolerances of some components, such as Bragg fiber and FBGs, can result in a wide variation in the dispersive properties of different fibers. It is also impractical to fine tune the dispersion of each laser system in a mass manufacturing environment, since the output of each system must be measured and then its dispersion must be fine tuned.

SUMMARY

Actively tunable dispersion compensators, or tuning elements, are incorporated into a chirped pulse amplification (CPA) system to control the net amount of group velocity dispersion in the system. In some embodiments, the tuning elements are used to decrease the temporal width of the output pulse. In some embodiments, the CPA system includes Bragg fibers configured to stretch and compress an optical pulse. In these embodiments, the tuning elements may be used to overcome difficulties associated with matching the dispersion of the Bragg fibers and/or the other elements of the system in order to control the net dispersion experienced by a pulse as it propagates through the system. In further embodiments, the tuning elements are configurable to tune higher-order dispersions, such as dispersion slope and quadratic dispersion, or to account for phase shifts in the pulse caused by nonlinear optical effects.

In some embodiments, the tuning elements include tunable fiber Bragg gratings. The fiber Bragg gratings are configured to stretch or compress the optical pulse duration by varying degrees and, thus, tune the overall dispersion of the CPA system. The fiber Bragg gratings are tuned, for example, by placing them in varying thermal or strain gradients. A thermal gradient can be actively controlled, for example, by resistively heating a metal film deposited at various thicknesses along the length of the fiber. A strain gradient can be controlled, for example, by placing the fiber Bragg grating across the neutral axis of a physical beam subject to a four-point bend and having a variable force applied to it. Further embodiments include a fiber Bragg grating constructed using photorefractive and photosensitive materials with specific optical characteristics. In these embodiments, tuning is performed by activating these materials using actinic radiation.

In alternative embodiments, the tuning elements include a tunable Bragg fiber. For example, a Bragg fiber may be tuned by thermally heating the fiber by applying current to a metal film deposited on the Bragg fiber to resistively heat the Bragg fiber. In another example, a Bragg fiber is tuned by applying strain along the length of the fiber by either compressing or stretching the fiber, thus changing the thickness of the bi-layers that comprise the Bragg fiber. In alternative embodiments, the Bragg fiber is tuned by placing the fiber in varying thermal or strain gradients in configurations such as those used for tuning fiber Bragg gratings.

Further embodiments include a Bragg fiber constructed using photorefractive or photosensitive materials and dispersion tuning is performed by activating these materials using actinic radiation. When these materials are irradiated, their refractive index changes, this shifts the wavelength of the band gap profile, and thus changes the dispersion of the fiber at a given wavelength. As the Bragg fiber is tuned, light received by the Bragg fiber is chromatically dispersed by varying amounts.

In alternative embodiments, the tuning element includes a modulator configured to control the amplitude and/or phase of the propagating light. The modulator is used to alter the phase profile of an optical signal prior to amplification to counteract the effects of upstream or downstream optical dispersions on the propagating signal. Typically, the modulator is configured to alter the optical signal prior to compression. For example, in some embodiments, an optical modulator such as a dual-parallel Mach-Zehnder modulator is configured to stretch the optical pulse and/or to pre-distort the pulses to compensate for dispersion in the CPA system.

Tuning is optionally performed periodically and/or in real-time in response to a signal received by the tuning element from a pulse monitor.

DETAILED DESCRIPTION

An active tuning element is incorporated into a chirped pulse amplification system in order to control the overall group velocity dispersion of the system. Control of the overall dispersion enables optimization of a system output pulse. The output pulse is optimized to have specified optical characteristics (e.g. pulse width) at an output of the system and/or at a target surface where the output pulse is delivered.

Some embodiments include a CPA system comprising Bragg fibers or fiber Bragg gratings configured to change the temporal dispersion of a laser pulse. A fiber Bragg grating comprises a fiber having a number of spaced regions of variable refractive index along its length. In contrast, a Bragg fiber comprises a fiber having a number of concentric layers with varying indices of refraction, see, e.g., U.S. patent application Ser. No. 11/112,256, now U.S. Pat. No. 7,349,452, which is hereby incorporated herein by reference. These components can be used to increase or decrease the temporal dispersion of the CPA system.

At least two types of active tuning elements are within the scope of the invention. A first type is configured to control the dispersion of an existing element within the CPA system. For example, an active tuning element of the first type may be used to control the dispersion of an optical fiber, such as a Bragg fiber, within a pulse stretcher or pulse compressor. The dispersion of an optical fiber may be altered by changing refractive index properties of the optical fiber. Methods of changing these refractive index properties are discussed further herein. The dispersion of the Bragg fiber may also be changed by physically stretching or compressing it longitudinally.

A second type of active tuning element is included as an additional dispersive element within the CPA system. For example, an additional dispersive element may be inserted between a pulse stretcher and a pulse amplifier in order to control the net dispersion of the system or its effect on the system. In certain embodiments, the addition of a separate active tuning element is configured to compensate for any mismatch between the temporal dispersion caused by a pulse stretcher and the temporal dispersion caused by a pulse compressor. In some embodiments, a separate active tuning element is configured to compensate for dispersion of other system elements (e.g. an amplifier, a delivery fiber, elements having an air gap where an optical path length varies by environmental fluctuations, or an air gap between a system output and a target surface). The active tuning element is optionally a modulator, a fiber Bragg grating, a bulk grating pair, a Bragg fiber, or the like. In some embodiments, the added active tuning element is an element having lower but more accurately controlled dispersion properties relative to other elements within the system.

Some embodiments further comprise a pulse monitor configured to measure one or more characteristics of the output of the CPA system, these characteristics can include pulse energy, flux, average power, the temporal width, or the like. The pulse monitor is disposed, for example, at a system output or at a target surface. The pulse monitor is typically configured to supply feedback to the active tuning element to control the dispersion in the system in real-time as output pulses are generated. This pulse monitor could be as simple as a photodetector fabricated from a material with a bandgap larger than the energy of a single photon, e.g. a silicon photodetector used to monitor light at ~1550 nm. In this particular case, a multi-photon event is needed to create an appreciable signal in the detector and thus this signal strength is related to pulse peak power and pulse duration. In other embodiments, the pulse detector may be an optical pulse correlator, a frequency-resolved optical gating (FROG) system, a cross-correlator, a gated pulse analyzer, and/or the like.

In some embodiments, a Bragg fiber is configured to stretch or compress an optical pulse. Due to manufacturing variations, different Bragg fibers may contribute various different amounts of temporal dispersion when included in a CPA system. It is, therefore, useful to include additional fine-tuning in CPA systems that include Bragg fibers in order to optimize system output. Some embodiments, therefore, include an active-tuning element configured to provide this additional tuning. In some embodiments, this active tuning element is associated with and configured to change dispersion properties of the Bragg fiber. In other embodiments, this active tuning element is part of an additional dispersive element within the CPA system, configured to compensate for unwanted dispersive properties of the Bragg fiber.

Figure 1:
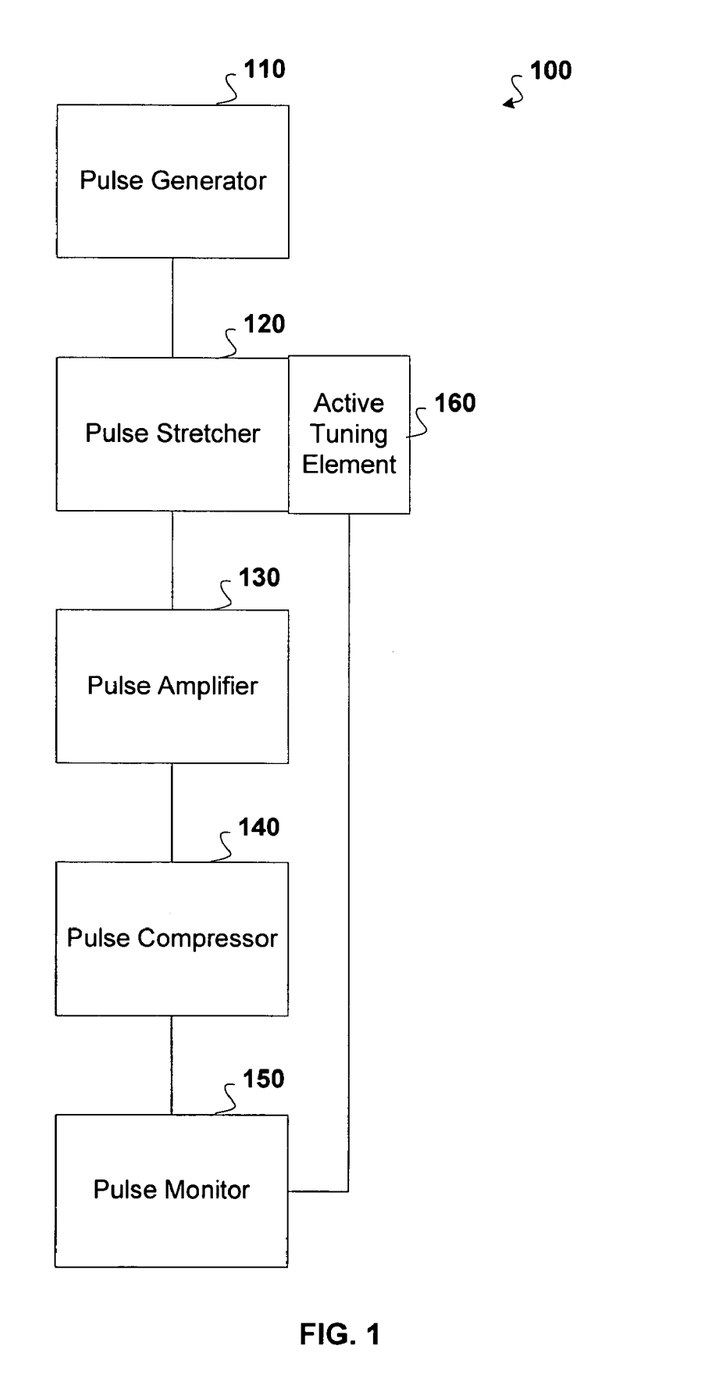
FIG. 1 is a block diagram illustrating a system wherein a pulse stretcher is configured as an active tuning element, according to various embodiments of the invention.

FIG. 1 illustrates a pulse generation system 100 configured to generate a short laser pulse. Pulse generation system 100 includes a pulse generator 110 configured to generate a seed pulse, and a pulse stretcher 120, a pulse amplifier 130 and a pulse compressor 140. Pulse generation system 100 further includes a pulse monitor 150 and an active tuning element 160 configured to dynamically optimize the output of pulse generation system 100.

Pulse generator 110 is configured to generate a seed pulse having a certain duration, and optical amplitude and phase profile. In various embodiments, pulse generator 110 comprises, for example, a ring laser, a laser oscillator, a chirped pulse source, a quasi-continuous wave laser, or the like.

Pulse stretcher 120 is configured to increase the temporal duration of the seed pulse. In the embodiments illustrated in FIG. 1, pulse stretcher 120 is coupled to an active tuning element 160 configured to control the temporal dispersion of the pulse stretcher. Some embodiments of the pulse stretcher 120 include acousto-optic dispersive filters or tunable filters. In other embodiments, pulse stretcher 120 is a fiber Bragg grating or Bragg fiber subject to a varying thermal or strain gradient applied by active tuning element 160 to change the refraction index properties of the optical fiber.

A strain gradient is applied to the fiber Bragg grating or Bragg fiber, for example, by placing the fiber Bragg grating or Bragg fiber across a neutral axis of a physical beam subject to a four-point bend. For example, in one embodiment, the strain gradient is applied to a fiber Bragg grating as described in U.S. Pat. No. 5,694,501 by Alavie, et al. The strain gradient is then actively controlled by varying the force applied to the physical beam. As the strain along the physical beam varies linearly along the width of the beam, the beam will exert a linear strain along the length of the fiber Bragg grating or Bragg fiber that is attached across the width of the beam. The linear strain stretches or compresses the space between the gratings in the fiber Bragg grating or the space between layers in a Bragg fiber, varying the dispersion characteristics of the fiber Bragg grating or Bragg fiber. As the dispersion of the pulse stretcher is controlled by changing the strain applied to the physical beam, the net dispersion of the system is also controlled. The applied strain can, thus, be used to optimize the net dispersion of the system.

In alternative embodiments, a thermal gradient is applied by the active tuning element 160 along a length of the fiber Bragg grating or Bragg fiber configured to stretch the laser pulse. For example, to apply the thermal gradient, a metal film having a thickness varying linearly may be deposited around the circumference of the Bragg fiber or fiber Bragg grating along part of the optical fiber length. For example, in one embodiment, the metal film is deposited as described by Eggleton et al., "Electrically Tunable Power Efficient Dispersion Compensating Fiber Bragg Grating," Photonics Technology Letters 11(7), pages 854-856, July 1999. An electrical current is passed through the film to resistively heat the film and, thus, heat the fiber Bragg grating or Bragg fiber to alter the refractive index of the fiber materials comprising the fiber Bragg grating or Bragg fiber. As the refractive index changes, so does the dispersion of the fiber Bragg grating or Bragg fiber, and of the pulse stretcher 120. In these embodiments, the temporal dispersion of the pulse stretcher 120, and thus the CPA system 100, is changed by controlling the current passed through the metal film coating the fiber Bragg grating or Bragg fibers.

In other embodiments, pulse stretcher 120 comprises a Bragg fiber or fiber Bragg grating constructed using photorefractive and photosensitive materials wherein the presence or absence of actinic radiation changes the refractive index of the materials. In these embodiments, the active tuning element 160 is configured to provide actinic radiation. As regions of the Bragg fiber or fiber Bragg grating are illuminated by the actinic radiation, the optical characteristics, including the refractive index of the Bragg fiber or fiber Bragg grating, change. The temporal dispersion of the pulse stretcher 120 is changed controllably by the presence or absence of actinic radiation.

In the embodiments of pulse stretcher 120 comprising a Bragg fiber, the active tuning element 160 is optionally configured to tune the Bragg fiber section by section using a combination of one or more of the techniques described herein. An applied temperature or strain gradient or applied actinic radiation tunes each portion along the length of the Bragg fiber as described herein.

Amplifier 130 is configured to add energy to the stretched pulse. In some embodiments, the amplifier 130 is a fiber-amplifier pumped by pump diodes. In other embodiments, the amplifier 130 is a semiconductor optical amplifier. In some embodiments, the CPA system comprises more than one amplifier. In other embodiments, the amplifier 130 is a solid state optical amplifier, such as Nd:YAG or Yb:YAG.

Pulse compressor 140 is configured to temporally compress the amplified pulse.

In some embodiments, pulse compressor 140 comprises an air-path between bulk optic gratings as a Treacy compressor. In other embodiments, the amplified pulse is compressed using a fiber Bragg grating or a Bragg fiber. Tuning the pulse compressor in the CPA system is discussed further elsewhere herein, for example in the description of the various embodiments shown in FIG. 2.

Pulse monitor 150 is configured to measure characteristics of the output pulse. In various embodiments, these characteristics include the temporal width of the output pulse and the energy of the output pulse to determine the peak power of the output pulse. In some embodiments, the pulse monitor 150 is disposed near the output of the pulse compressor 140. In other embodiments, pulse monitor 150 is disposed at an intermediate point between the output of the pulse compressor 140 and a target surface, such as in a catheter. In still other embodiments, the pulse monitor 150 is disposed at the target surface where the output pulse is delivered.

The pulse monitor 150 is configured to deliver feedback to the active tuning element 160 to adjust, for example, the current passed through heating wires coupled to a fiber Bragg grating or a Bragg fiber, the force applied to a physical beam coupled to a fiber Bragg grating or a Bragg fiber, or the amount of actinic radiation applied to a Bragg fiber, thereby tuning the dispersion of the CPA system as described above. In some embodiments, the pulse monitor 150 is further configured to tune the dispersion of the system to optimize an output pulse at a target surface after the output pulse is passed through an additional component (not shown), such as catheter or an air gap, wherein the additional component further alters the temporal width of the pulse.

Figure 2:
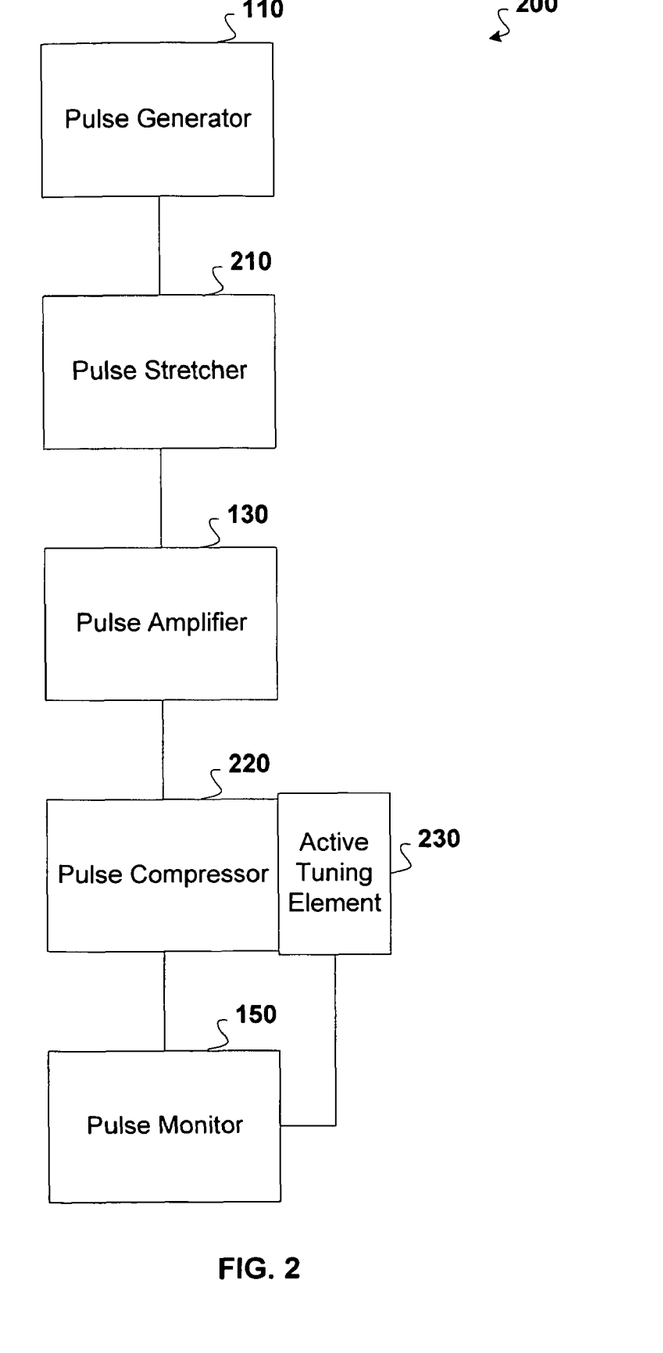
FIG. 2 is a block diagram illustrating a system wherein a pulse compressor is configured as an active tuning element, according to various embodiments of the invention.

FIG. 2 illustrates a pulse generation system 200 configured to generate a short laser pulse. Pulse generation system 200 includes a pulse generator 110 configured to generate a seed pulse as described herein, a pulse stretcher 210, a pulse amplifier 130 configured to amplify the seed pulse as described herein, and a pulse compressor 220. Pulse generation system 200 further includes a pulse monitor 150 as described herein configured to provide feedback to an active tuning element 230 configured to dynamically control the output of pulse generation system 200. In these embodiments, the pulse generator 110, the pulse amplifier 130, and the pulse monitor 150 are comparable to the components in other embodiments described herein.

The pulse stretcher 210 is configured to increase the temporal width of the seed pulse. The pulse stretcher 210 may comprise a Bragg fiber, a fiber Bragg grating, or the like. In some embodiments, pulse stretcher 210 further comprises an active tuning element as described herein.

The pulse compressor 220 is configured to decrease the temporal width of the seed pulse after it has been amplified. The pulse compressor 220 may comprise a Bragg fiber, a fiber Bragg grating or an air-path between bulk optic gratings configured as a Treacy compressor.

For those embodiments illustrated in FIG. 2, the active tuning element 230 is configured to change the temporal dispersion contributed to the CPA system by the pulse compressor 220. In some embodiments, the active tuning element 230 is configured to apply a strain gradient or a thermal gradient to the Bragg fiber or fiber Bragg grating as described herein. In other embodiments, the active tuning element 230 can also be configured to apply actinic radiation to the Bragg fiber or fiber Bragg grating as described herein.

Figure 3:
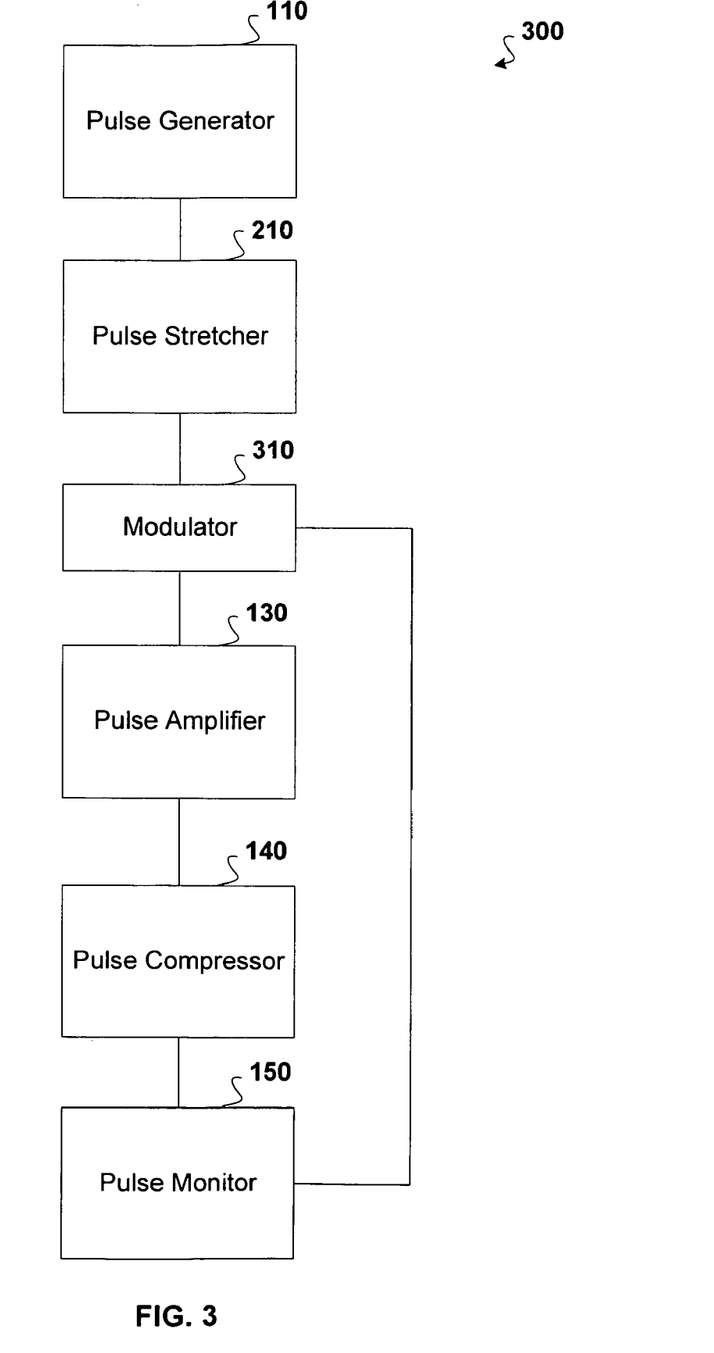
FIG. 3 is a block diagram illustrating a system further comprising a modulator configured as an active tuning element, according to various embodiments of the invention.

FIG. 3 illustrates a pulse generation system 300 configured to generate a short laser pulse. Pulse generation system 300 includes a pulse generator 110 configured to generate a seed pulse as described herein, a pulse stretcher 210 as described herein, an optical amplitude and/or phase modulator 310 configured to dynamically optimize the output of pulse generation system 200, a pulse amplifier 130 configured to amplify the seed pulse as described herein, and a pulse compressor 140 as described herein. Pulse generation system 300 further includes a pulse monitor 150 as described herein. The pulse generator 110, the pulse stretcher 210, the pulse amplifier 130, the pulse compressor 140, and the pulse monitor 150 are comparable to the components in other embodiments as described herein. In some embodiments, the pulse compressor 140 comprises a Treacy compressor.

The modulator 310 is configured to control the amplitude and/or phase along the stretched optical pulse to compensate for first and higher-order dispersions. The modulator 310 is used to alter the phase profile of an optical signal prior to amplification to counteract the effects of upstream or downstream optical dispersions on the propagating signal. In some cases, the modulator 310 may be configured to alter the phase of the optical signal to compensate for first, second, third, and/or higher orders of dispersion. For example, in one embodiment, adding a phase modulator is a form of signal pre-distortion to account for the undesired residual dispersions and optical nonlinearities in the system. Others have used a similar technique to optimize the received signal in optical fiber communications to pre-distort signals before they propagate through many kilometers of optical fiber, for example, Hellström, et al., "Third Order Dispersion Compensation Using a Phase Modulator," Journal of Lightwave Technology vol. 21 no. 5, pages 1188-1197, May 2003. The functional form of a signal used to drive the modulator may be a cubic, quadratic, sine, or cosine function, or other desired function to control the dispersion of the output signal or the spectral width of an output signal. In some embodiments, the modulator 310 is used to approximate a Cartesian electric-to-optical convertor, such as a dual-parallel Mach-Zehnder modulator, to perform arbitrary E-field modulation. In various embodiments, modulator 310 may comprise a dual-drive Mach-Zehnder modulator, a Lithium-Niobate device, liquid crystals, or the like.

A Mach-Zehnder modulator may be used, for example, to compensate for temporal spreading of the pulse caused by the light intensity of the optical pulse (self-phase modulation), mismatched Bragg fibers, environmental effects and dispersion sources described herein. In some of these embodiments, the Mach-Zehnder modulator is also configured to increase the temporal dispersion of the system, by acting as part of the pulse stretcher 210. To illustrate, one, embodiment of the CPA system comprises a pulse generator 110 coupled to a Mach-Zehnder modulator which is coupled to a pulse amplifier 130. The pulse amplifier 130 is, in turn, coupled to a pulse compressor 140. The Mach-Zehnder modulator is an extra element that adds a form of pre-distortion; pre-distortion in a different context is described in, for example, Killey, et al., "Electronic Dispersion Compensation by Signal Pre-Distortion Using Digital Processing and a Dual-Drive Mach-Zehnder Modulator," Photonics Technology Letters 17(3), pages 714-716, March 2005.

In some embodiments, a modulator 310 is configured to account for phase distortions due to optical non-linearities in the system. A characteristic of this type of dispersion during amplification is the broadening or narrowing of an optical spectrum within a stretched pulse. This may result in pulse distortion and/or a loss of energy to spectral sidebands, the magnitude of which depends on a sign and magnitude of the initial pulse chirp entering the non-linear media. See, for example, Nibbering, et al., "Spectral Determination of the Amplitude and the Phase of Intense Ultrashort Optical Pulses," J. Opt. Soc. Am. B vol. 13 no. 2, pages 317-329, February 1996, demonstrating in a different context how isolated changes to the quadratic and cubic phase of a pulse can produce drastically different output spectra. Further, in other types of systems, it has been shown that net third order dispersion can be balanced by a non-linear chirp accumulated during amplification in an ytterbium fiber gain system. See, e.g., Zhou, et al., "Compensation of Nonlinear Phase Shifts with Third-Order Dispersion in Short-Pulse Fiber Amplifiers," Optics Express vol. 13 no. 13, pages 4869-4877, Jun. 27, 2005.

Figure 4:
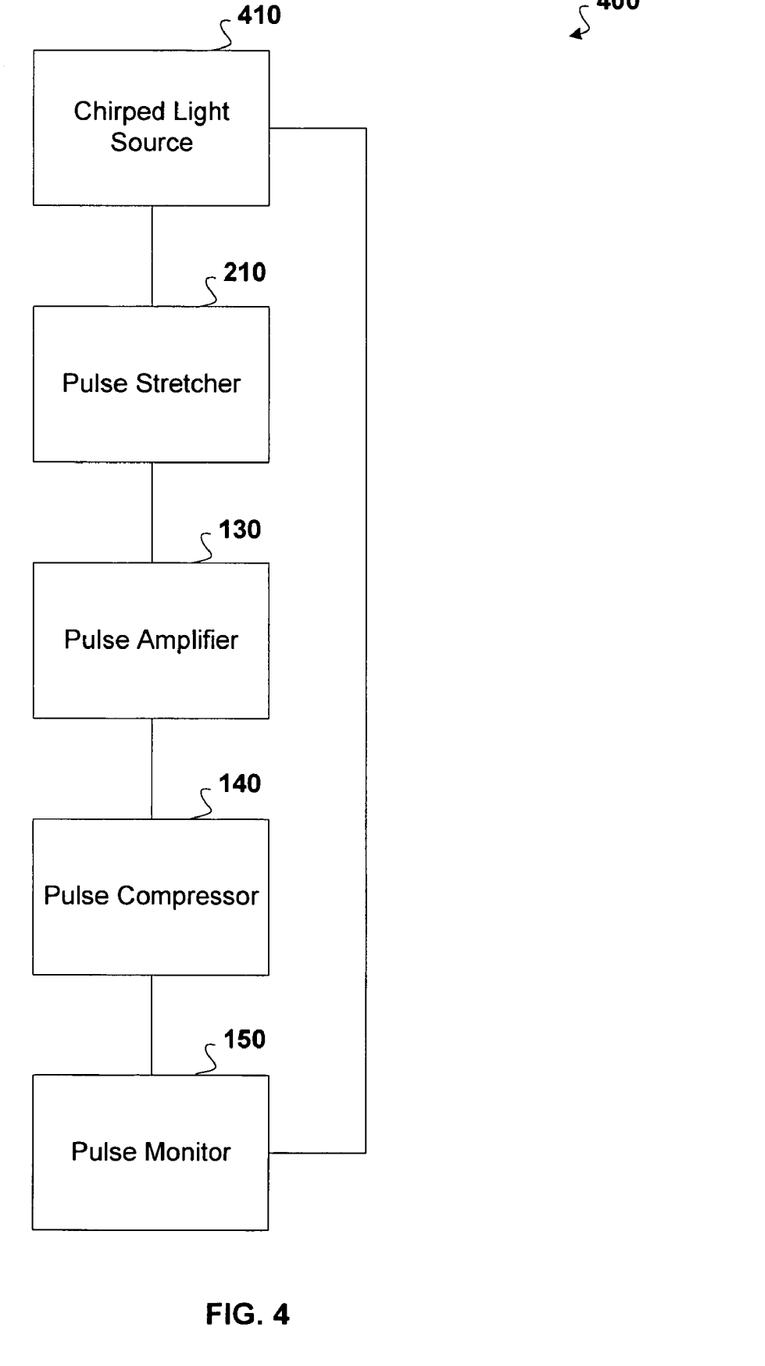
FIG. 4 is a block diagram illustrating a system further comprising a chirped light source configured as an active tuning element, according to various embodiments of the invention.

FIG. 4 illustrates a pulse generation system 400 configured to generate a short laser pulse. Pulse generation system 400 includes a chirped light source 410 configured to generate a chirped seed pulse, a pulse stretcher 210, a pulse amplifier 130 configured to amplify the seed pulse as described herein, and a pulse compressor 140. Pulse generation system 400 further includes a pulse monitor 150 as described herein. The pulse stretcher 210, the pulse amplifier 130, the pulse compressor 140 and the pulse monitor 150 are comparable to the components described in the embodiments herein. In various embodiments, the chirped light source 410 comprises a Distributed Bragg Reflector (DBR) laser. In alternative embodiments, a chirped pulse is created by sculpting a pulse from a continuous-amplitude frequency-modulated source by using a Mach-Zehnder modulator.

In some embodiments, chirped light source 410 comprises a DBR laser. In this instance, a constant amplitude signal is frequency modulated to create a desired chirped signal. The phase profile of the DBR laser output is modified to match the dispersion in the rest of the pulse generation system 400. In one embodiment, the DBR laser is tuned, for example, as disclosed in U.S. Pat. No. 6,834,134 by Brennan, III, et al., which is hereby incorporated herein by reference. The dispersion of 410, for example, is tunable to match the dispersion of other components such as the pulse stretcher 210 or the pulse compressor 140, the dispersion caused by environmental effects, or the dispersion introduced due to the intensity of the light pulse. In some embodiments, the DBR laser is configured to also increase or decrease the temporal dispersion of the chirped seed pulse. In these embodiments, as the DBR laser stretches the light pulse, the pulse generation system 400 may not include a pulse stretcher 210.

Figure 5:
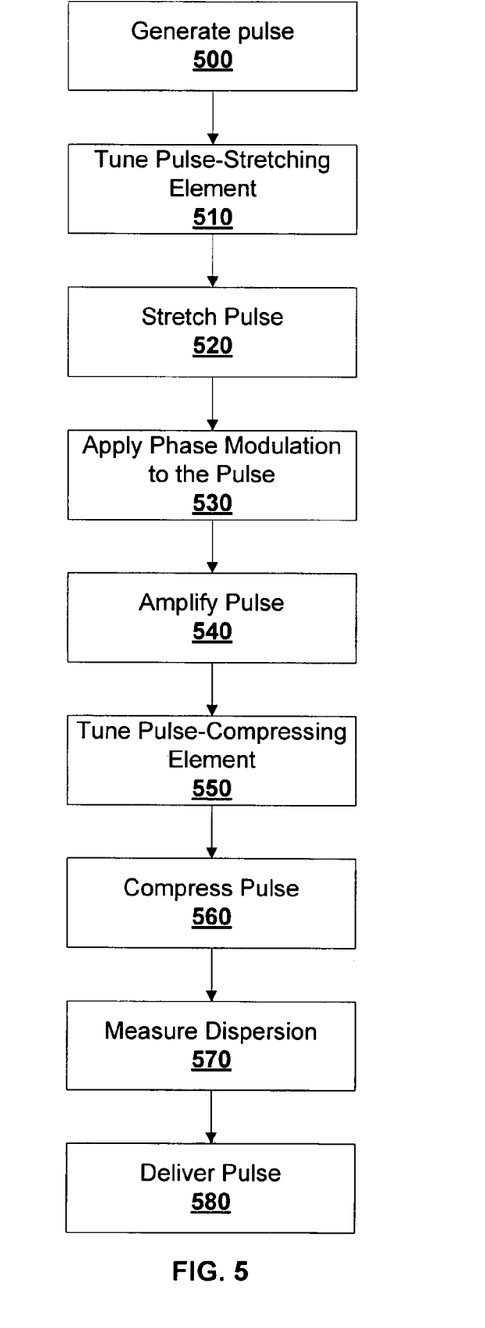
FIG. 5 is a flowchart illustrating a method included in various embodiments of the invention.

The flowchart in FIG. 5 illustrates a method used in some embodiments to generate an output pulse. First, a Step 500 includes generating a pulse using a pulse generator 110 or chirped pulse source 410 as described herein. Second, an optional step 510 includes tuning a pulse-stretching element, such as pulse stretcher 120 using an active tuning element, such as active tuning element 160. Third, a step 520 includes stretching the pulse using, e.g. pulse stretcher 120 or pulse stretcher 210. Fourth, an optional step 530 includes applying amplitude and/or phase modulation to the stretched pulse using, e.g. modulator 310. Fifth, a step 540 includes amplifying the pulse using, e.g. pulse amplifier 130. Sixth, an optional step 550 includes tuning a pulse-compressing element such as active tuning element 230. Seventh, a step 560 includes compressing the pulse using, e.g. pulse compressor 140 or pulse compressor 220. Eighth, a step 570 includes measuring the dispersion and/or pulse intensity of the output pulse as described herein using, e.g. pulse monitor 150. Ninth, a step 580 includes delivering the pulse to a target surface. The order of steps 570 and 580 is optionally reversed such that the pulse is first delivered then measured. At least one of the optional tuning steps, e.g. 510, 530, or 550, is used in typical embodiments of the invention.

In various embodiments at least one of these optional tuning steps is performed during the operation of the CPA system. In some embodiments, the tuning step is performed periodically. In some embodiments, the tuning step is performed in real-time.

The optimization performed using active tuning can be directed toward a variety of different operational parameters. For example, tuning the CPA system such that the output pulse delivers a specified amount of power to a target surface. In various embodiments, the net dispersion of the system is optimized to control the temporal width of an output pulse, and/or control the fluence of a pulse while maintaining approximately the average pulse energy. In these embodiments, the output pulse may be optimized to ablate a material at a target surface.

Several embodiments are specifically illustrated and/or described herein. However, it will be appreciated that modifications and variations are covered by the above teachings and within the scope of the appended claims without departing from the spirit and intended scope thereof. For example, in some embodiments, Pulse Monitor 150 may be placed elsewhere in the system to provide feedback, e.g., before the pulse is compressed or phase modulated. In other embodiments, the system and method described herein may be used to measure or tweak another characteristic of the pulse, such as a spatial width. In still other embodiments, a pulse monitor further comprises a processor capable of receiving user inputs. In alternative embodiments, photonic crystal or other microstructured fibers may substitute for the Bragg fibers.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A chirped pulse amplification system, comprising:
   a pulse generator, configured to generate a laser pulse;
   a pulse stretcher, configured to generate a stretched pulse from the laser pulse by dispersing the laser pulse temporally as a function of wavelength;
   a pulse amplifier, configured to generate an amplified pulse from the stretched pulse;
   a pulse compressor, configured to generate a compressed pulse from the amplified pulse;
   an active tuning element configured to tune a group velocity dispersion of the chirped pulse amplification system and control a temporal width of the compressed pulse; and
   a pulse monitor configured to measure one or more characteristics of the compressed pulse, the active tuning element being responsive to an output of the pulse monitor.

2. The system of claim 1, wherein the active tuning element compensates for dispersion variations caused by changes in an environment, alterations to an optical path length of free-space elements, or variations in pulse intensity.

3. The system of claim 1, wherein the active tuning element compensates for dispersion variations in a Treacy compressor.

4. The system of claim 1, wherein the active tuning element comprises a heating element or a physical beam coupled to the pulse stretcher or to the pulse compressor.

5. The system of claim 1, wherein the active tuning element tunes the duration of the laser pulse.

6. The system of claim 1, wherein the pulse monitor comprises a correlator or power meter configured to measure a temporal width of the compressed pulse.

7. The system of claim 1, wherein the active tuning element comprises a modulator.

8. The system of claim 1, wherein the active tuning element comprises a physical beam configured to apply a strain gradient to a fiber Bragg grating.

9. The system of claim 1, wherein the active tuning element comprises a heater configured to apply a thermal gradient to a fiber Bragg grating.

10. The system of claim 1, wherein the active tuning element comprises a Bragg fiber or a fiber Bragg grating constructed using photosensitive or photorefractive materials activated by actinic radiation.

11. The system of claim 1, wherein tuning the group velocity dispersion includes applying a strain gradient, a heat gradient or actinic radiation to a Bragg fiber and results in a change to an optical band gap of the Bragg fiber.

12. The system of claim 1, wherein a modulator chromatically disperses the laser pulse to generate a stretched pulse and actively tunes the chromatic dispersion to optimize an output pulse characteristic.

13. The system of claim 1, wherein the active tuning element comprises part of a chirped pulse source.

14. The system of claim 1, wherein the active tuning element is configured to tune at least dispersion and dispersion slope.

* * * * *